(12) United States Patent
Zhu et al.

(10) Patent No.: US 12,044,890 B2
(45) Date of Patent: Jul. 23, 2024

(54) OPTICAL MODULE UNLOCKING APPARATUS, OPTICAL MODULE, AND OPTICAL COMMUNICATIONS DEVICE

(71) Applicant: HUAWEI TECHNOLOGIES CO., LTD., Guangdong (CN)

(72) Inventors: Yabing Zhu, Wuhan (CN); Song Yang, Wuhan (CN); Liang Xu, Shenzhen (CN); Yu Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 87 days.

(21) Appl. No.: 17/852,582

(22) Filed: Jun. 29, 2022

(65) Prior Publication Data

US 2022/0326457 A1    Oct. 13, 2022

Related U.S. Application Data

(63) Continuation of application No. PCT/CN2019/130879, filed on Dec. 31, 2019.

(51) Int. Cl.
*H04B 10/00* (2013.01)
*G02B 6/42* (2006.01)

(52) U.S. Cl.
CPC ......... *G02B 6/4261* (2013.01); *G02B 6/4292* (2013.01); *G02B 6/4262* (2013.01)

(58) Field of Classification Search
CPC .. G02B 6/4261; G02B 6/4292; G02B 6/4262; G02B 6/4274
See application file for complete search history.

(56) References Cited

U.S. PATENT DOCUMENTS 6,824,416 B2    11/2004   Di Mascio
6,872,010 B1    3/2005    Bianchini
(Continued)

FOREIGN PATENT DOCUMENTS

CN    101110640 A    1/2008
CN    101614850 A    12/2009
(Continued)

OTHER PUBLICATIONS

Chinese Office Action for Application No. 201980102273.8 dated Oct. 27, 2022, 22 pages.
(Continued)

*Primary Examiner* — Agustin Bello

(57) ABSTRACT

An optical module unlocking apparatus includes: a base, a sliding member, a driving piece, and an elastic piece. The sliding member is slidably disposed on the base along an insertion direction. The driving piece is rotatably connected to the base, the other end of the sliding member is connected to the driving piece, and the driving piece can rotate from a locked state to an unlocked state relative to the base under an action of external force, and drive the sliding member to move relative to the base along the insertion direction. A second connecting part is disposed on the driving piece. Because the driving piece is located outside a cage, space for disposing the elastic piece on the driving piece is sufficient, and the driving piece does not need to fit a spring plate. This simplifies a structure of the optical module and improves processing efficiency.

17 Claims, 10 Drawing Sheets

(56) References Cited

U.S. PATENT DOCUMENTS

| | | | |
|---|---|---|---|
| 6,884,097 B2* | 4/2005 | Ice | G02B 6/4261 361/728 |
| 7,186,134 B2 | 3/2007 | Togami et al. | |
| 7,255,490 B2* | 8/2007 | Zhang | G02B 6/4292 385/139 |
| 7,317,862 B2* | 1/2008 | Minota | G02B 6/4292 439/372 |
| 8,465,215 B1* | 6/2013 | Huang | G02B 6/36 385/75 |
| 9,146,366 B2* | 9/2015 | Koutrokois | G02B 6/4277 |
| 9,523,828 B2* | 12/2016 | Ishii | G02B 6/4246 |
| 9,551,847 B2* | 1/2017 | Wang | G02B 6/4261 |
| 9,720,189 B1* | 8/2017 | Wang | G02B 6/4261 |
| 10,042,130 B1* | 8/2018 | Wang | H04B 10/40 |
| 10,177,494 B1* | 1/2019 | Lu | H01R 13/631 |
| 10,330,873 B2* | 6/2019 | Chuang | G02B 6/4292 |
| 10,606,001 B1* | 3/2020 | Ko | G02B 6/4246 |
| 11,098,738 B2* | 8/2021 | Lu | F16B 2/14 |
| 2003/0198025 A1* | 10/2003 | Cao | G02B 6/4201 361/728 |
| 2004/0033027 A1* | 2/2004 | Pang | G02B 6/3825 385/53 |
| 2005/0148223 A1* | 7/2005 | Shirk | H01R 13/6275 439/160 |
| 2005/0196109 A1* | 9/2005 | Kim | G02B 6/4292 385/92 |
| 2005/0208822 A1* | 9/2005 | Ishigami | G02B 6/4201 439/372 |
| 2005/0260880 A1* | 11/2005 | Seo | G02B 6/4261 439/372 |
| 2007/0066248 A1* | 3/2007 | Ka | G02B 6/4261 455/90.3 |
| 2007/0123090 A1* | 5/2007 | Kim | G02B 6/4261 439/372 |
| 2009/0274468 A1* | 11/2009 | Zhang | G02B 6/4201 398/139 |
| 2011/0170832 A1 | 7/2011 | Yamai et al. | |
| 2012/0275120 A1* | 11/2012 | Nguyen | G02B 6/4292 361/747 |
| 2013/0148929 A1* | 6/2013 | Huang | G02B 6/4261 385/77 |
| 2014/0029895 A1* | 1/2014 | Sasaki | G02B 6/4246 385/53 |
| 2014/0104808 A1* | 4/2014 | Koutrokois | G02B 6/4261 403/326 |
| 2014/0134898 A1* | 5/2014 | Wang | H01R 13/635 439/843 |
| 2015/0188636 A1* | 7/2015 | Su | G02B 6/4261 398/139 |
| 2016/0266340 A1* | 9/2016 | Zhang | G02B 6/4284 |
| 2017/0363828 A1* | 12/2017 | Zhu | G02B 6/42 |
| 2018/0172927 A1* | 6/2018 | Song | G02B 6/26 |
| 2018/0252871 A1* | 9/2018 | Yeh | G02B 6/4292 |
| 2019/0013617 A1* | 1/2019 | Ayzenberg | H01R 13/6582 |
| 2019/0044299 A1* | 2/2019 | Kazav | H01R 27/00 |
| 2019/0203750 A1* | 7/2019 | Lu | F16B 2/185 |
| 2019/0278037 A1* | 9/2019 | Leigh | G02B 6/4284 |
| 2019/0289731 A1 | 9/2019 | Mei et al. | |
| 2020/0088961 A1* | 3/2020 | Zeng | G02B 6/4284 |
| 2020/0278510 A1* | 9/2020 | Zhou | G02B 6/4261 |
| 2020/0313348 A1* | 10/2020 | Liu | H01R 13/639 |
| 2020/0335904 A1* | 10/2020 | Lu | G02B 6/4261 |
| 2021/0141176 A1* | 5/2021 | Lu | G02B 6/428 |
| 2021/0149133 A1* | 5/2021 | Kuramochi | G02B 6/4261 |
| 2022/0326457 A1* | 10/2022 | Zhu | G02B 6/4292 |
| 2023/0266375 A1* | 8/2023 | Shu | G02B 6/4261 324/537 |

FOREIGN PATENT DOCUMENTS

| | | |
|---|---|---|
| CN | 101681004 A | 3/2010 |
| CN | 102141661 A | 8/2011 |
| CN | 104614821 A | 5/2015 |
| CN | 204441611 U | 7/2015 |
| CN | 106772831 A | 5/2017 |
| CN | 206920657 U | 1/2018 |
| CN | 109991704 A | 7/2019 |

OTHER PUBLICATIONS

European Patent Office extended European Search Report for Application No. 19958656 dated Nov. 21, 2022, 10 pages.

PCT International Search Report for Application No. PCT/CN2019/130879 dated Dec. 31, 2019, 10 pages.

Chinese Office Action for Application No. 201980102273.8 dated May 25, 2023, 10 pages.

* cited by examiner

OPTICAL MODULE UNLOCKING APPARATUS, OPTICAL MODULE, AND OPTICAL COMMUNICATIONS DEVICE

CROSS-REFERENCE TO RELATED DISCLOSURES

This application is a continuation of International Application No. PCT/CN2019/130879, filed on Dec. 31, 2019, the disclosure of which is hereby incorporated by reference in its entirety.

TECHNICAL FIELD

This application relates to the field of optical communications technologies, and more specifically, to an optical module unlocking apparatus, an optical module, and an optical communications device.

BACKGROUND

A pluggable optical module is mainly connected between a host and an optical cable, and can implement conversion between an optical signal and an electrical signal, so as to implement communication.

In a related technology, a cage for accommodating an optical module is disposed on a host, and a spring plate is disposed on the cage. The optical module is disposed in the cage in a pluggable manner, and an unlocking mechanism is disposed on the optical module. The unlocking mechanism includes a housing for installing a circuit board and a handle disposed on the housing. A connecting arm is disposed on a side surface of the housing, and the handle is connected to the connecting arm. After the optical module is plugged into the cage, the spring plate may abut against the connecting arm to lock the optical module. The handle may be rotated to unlock the optical module. In this case, the connecting arm moves relative to the housing to push the spring plate to unlock the optical module. In addition, to implement resetting of the connecting arm and the handle, a columnar coil spring abuts between the connecting arm and the housing. After the handle is released, the connecting arm can be restored to an original position under an action of elastic force of the coil spring.

However, in the foregoing related technology, a structure of the optical module is complex and is difficult to implement.

SUMMARY

This application provides an optical module unlocking apparatus, an optical module, and an optical communications device, so as to resolve a problem in a related technology that a structure of the optical module is complex and is difficult to implement.

According to a first aspect, this application discloses an optical module unlocking apparatus, including: a base, where the base is configured to install a circuit board, and a first connecting part is disposed on the base; a sliding member, where the sliding member is slidably disposed on the base along an insertion direction, and one end of the sliding member has an abutting part configured to abut against a spring plate of a cage; a driving piece, where the driving piece is rotatably connected to the base, the other end of the sliding member is connected to the driving piece, the driving piece can rotate from a locked state to an unlocked state relative to the base under an action of external force, and drive the sliding member to move relative to the base along the insertion direction, so that the abutting part is separated from the spring plate, and a second connecting part is disposed on the driving piece; and an elastic piece, where the elastic piece is connected between the first connecting part and the second connecting part, and when the external force disappears, the driving piece can restore from the unlocked state to the locked state under an action of elastic force of the elastic piece.

Based on the foregoing technical content, in this application, the elastic piece is disposed between the driving piece and the base. After an optical module is installed in the cage, the driving piece is located outside the cage. In comparison with the sliding member, space for disposing the elastic piece on the driving piece is sufficient, and the driving piece does not need to fit the spring plate. This simplifies a structure of the optical module and improves processing efficiency.

In an optional implementation, the elastic piece includes a spiral body, and a first supporting arm and a second supporting arm that are connected to two ends of the spiral body. A rotating shaft is disposed on the base. The driving piece is rotatably connected to the rotating shaft. The spiral body is sleeved on the rotating shaft, the first supporting arm abuts against the first connecting part, and the second supporting arm abuts against the second connecting part. The space occupied by the elastic piece can be reduced, and structures of the first connecting part and the second connecting part can be simplified. Further, a structure of the optical module unlocking apparatus and a manufacturing process are simplified, and costs are reduced. In addition, the elastic piece is an elastic piece deformed under compression, and has high reliability.

In an optional implementation, the first connecting part includes a protrusion disposed on the base. The first supporting arm abuts against a first side surface of the protrusion. A structure of the protrusion is simple and is easy to implement.

In an optional implementation, the protrusion includes a first segment and a second segment that are disposed at intervals along the insertion direction. The second segment and the rotating shaft are located on a side that is of the first segment and that is close to the abutting part. The first supporting arm is located between the first segment and the second segment, and a surface that is of the first segment and that faces the second segment forms the first side surface. The second segment and the first segment may limit two sides of the first supporting arm, to avoid detachment of the first supporting arm from the base during installation or use, facilitate installation of the elastic piece, and improve reliability of the elastic piece.

In an optional implementation, the protrusion further includes a third segment connected between the first segment and the second segment. The third segment is located at one end that is of the first segment and that is away from the rotating shaft. The first segment, the second segment, and the third segment form, in a surrounding manner, an accommodating groove used to accommodate the first supporting arm. The accommodating groove may further limit installation space of the first supporting arm, to facilitate installation. In addition, an area of the protrusion can be increased, and strength of the protrusion and the base can be improved.

In an optional implementation, the second connecting part includes a baffle plate disposed on the driving piece. The second supporting arm abuts against an inner surface that is of the baffle plate and that faces the rotating shaft. The structure is simple and is easy for processing.

In an optional implementation, the driving piece includes a body and a holding part that is connected to the body. A rotating shaft hole for passing through the rotating shaft is disposed on the body. The body is located outside the protrusion. The baffle plate is disposed at an edge of the body, and the baffle plate protrudes inwardly from the body along a direction parallel to an axis of the rotating shaft. Because the protrusion protrudes from the base, there is a specific space between the body and a second side surface, and the baffle plate can rotate freely in the space. The holding part may be used by an operator for holding, so as to facilitate the operator to rotate the driving piece.

Optionally, when the optical module is in the locked state, the holding part may be rotated to a bottom of the base along a preset direction, and a plane on which the holding part is located may be perpendicular to the preset direction. This can reduce a size of the driving piece and make the entire optical module more compact.

In an optional implementation, one rotating shaft is disposed at each of two ends of the base along the direction parallel to the axis of the rotating shaft. One body is disposed at each of two ends of the holding part, and each body is rotatably connected to one rotating shaft. When the operator pulls the holding part, force applied to the whole driving piece is balanced, and stability is high.

In an optional implementation, the rotating shaft is protuberantly disposed on the second side surface of the base, and one end that is of the rotating shaft and that is away from the base has a guide surface obliquely disposed. A distance between the guide surface and the second side surface increases from one end away from the abutting part to the other end close to the abutting part. When the body is installed, the body may slide along the guide surface, so that the rotating shaft hole is aligned with the rotating shaft, and the driving piece and the guide surface can be rotationally connected in a quick and convenient manner.

In an optional implementation, an end surface disposed perpendicular to the axis of the rotating shaft is further disposed at the end that is of the rotating shaft and that is away from the base. The end surface is connected to an edge that is of the guide surface and that is close to the abutting part. After the body moves for a distance along the guide surface, the body may be in contact with the end surface. A contact area between the driving piece and the guide surface is relatively large, so as to avoid the guide surface from scratching the body.

In an optional implementation, a sliding groove is disposed on the body, and a sliding block is disposed on the sliding member. The sliding block is slidably disposed in the sliding groove, to convert a rotational motion of the driving piece into a straight-line movement of the sliding member along the insertion direction. The structure is simple and is easy to implement.

In an optional implementation, the body is disposed between the base and the sliding member.

The sliding groove passes through the driving piece along the direction parallel to the axis of the rotating shaft, and the sliding block is disposed on an inner surface that is of the sliding member and that faces the base.

Because structures such as the rotating shaft and the elastic piece are disposed between the body and the base, disposing the sliding member on an outer side of the body can simplify a structure between the body and the base and improve production efficiency.

In an optional implementation, a first clamping slot extending along the insertion direction is disposed on the base. A first limiting rib slidably disposed in the first clamping slot is disposed on the sliding member.

A length of the first limiting rib along the insertion direction may be less than a length of the first clamping slot, so that the first limiting rib can slide in the first clamping slot. In addition, the first clamping slot may further limit movement of the sliding member along the direction parallel to the axis of the rotating shaft.

In an optional implementation, a groove for accommodating the sliding member is disposed on the base. The first clamping slot is disposed on an inner wall surface of the groove. The first limiting rib is located at one end of the sliding member along a preset direction, where both the preset direction and the insertion direction are perpendicular to a rotation axis of the driving piece.

After the driving piece is installed in the groove, an outer surface of the driving piece may be approximately parallel to a side surface of the base, so as to improve integrity of the optical module. Because a size of the cage has a specific standard, installing the driving piece in the groove may correspondingly increase a size of an accommodating region for accommodating the circuit board in the base, and improve function diversity of the optical module.

In an optional implementation, there are a plurality of first limiting ribs. The plurality of first limiting ribs are arranged at intervals along the insertion direction, so that the sliding member can be prevented from shaking in a sliding process, and stability is high.

In an optional implementation, a cover body is further disposed on the base. The cover body and the base together form, in a surrounding manner, the accommodating region for accommodating the circuit board, so as to facilitate removal or installation of the circuit board.

In an optional implementation, a second clamping slot extending along the insertion direction is disposed on the cover body. A second limiting rib slidably disposed in the second clamping slot is disposed on the sliding member. A length of the second limiting rib along the insertion direction may be less than a length of the second clamping slot, so that the second limiting rib can slide in the second clamping slot. In addition, the second clamping slot may further limit movement of the sliding member along the direction parallel to the axis of the rotating shaft.

Optionally, there are a plurality of second limiting ribs. The plurality of second limiting ribs are arranged at intervals along the insertion direction, so that the sliding member can be prevented from shaking in the sliding process, and stability is high.

According to a second aspect, this application discloses an optical module, including a circuit board and an optical module unlocking apparatus. The circuit board is installed on a base. Based on the foregoing technical content, in this application, an elastic piece is disposed between a driving piece and a base. After the optical module is installed in a cage, the driving piece is located outside the cage. In comparison with a sliding member, space for disposing the elastic piece on the driving piece is sufficient, and the driving piece does not need to fit the spring plate. This simplifies a structure of the optical module and improves processing efficiency.

According to a third aspect, this application discloses an optical communications device, including a cage and an optical module. A spring plate is disposed on the cage, the optical module is plugged into the cage, and an abutting part of the optical module abuts against the spring plate. Based on the foregoing technical content, in this application, an elastic piece is disposed between a driving piece and a base. After the optical module is installed in the cage, the driving piece is located outside the cage. In comparison with a sliding member, space for disposing the elastic piece on the driving piece is sufficient, and the driving piece does not need to fit the spring plate. This simplifies a structure of the optical communications device and improves processing efficiency.

With reference to the foregoing technical solutions, according to the optical module unlocking apparatus, the optical module, and the optical communications device that are disclosed in this application, a base, a driving piece, a sliding member, and an elastic piece are disposed. The driving piece is rotatably connected to the base, the sliding member can slide relative to the base, and the driving piece can further convert a rotational motion into sliding of the sliding member, so as to unlock the optical module. After the optical module is installed in the cage, the driving piece is located outside the cage. In comparison with the sliding member, space for disposing the elastic piece on the driving piece is sufficient, and the driving piece does not need to fit the spring plate. Disposing the elastic piece between the driving piece and the base simplifies a structure of the optical module and improves processing efficiency.

DESCRIPTION OF REFERENCE NUMERALS

Figure 1:
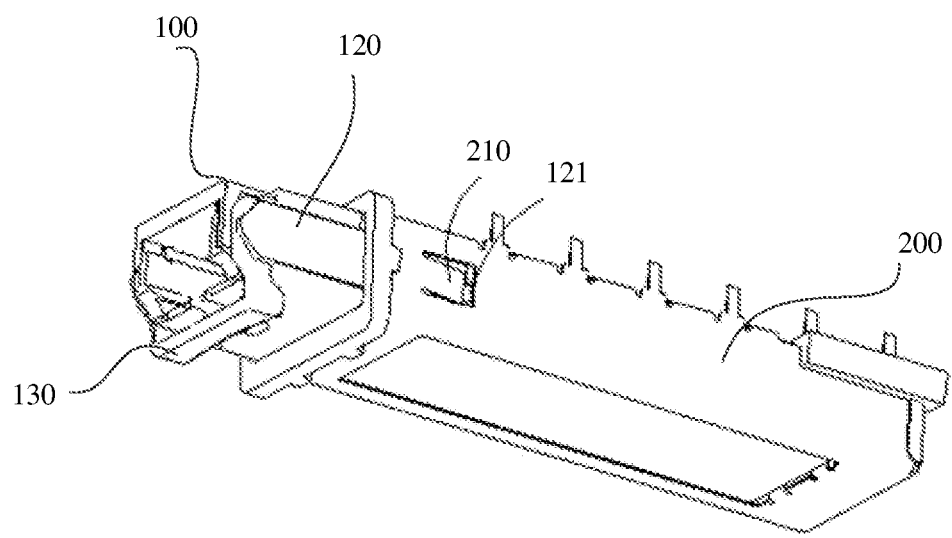
FIG. 1 is a schematic diagram of a structure of an optical communications device according to an embodiment of this application.

100: optical module; 110: base;
111: first connecting part; 112: protrusion;
1121: first side surface; 1122: first segment;
1123: second segment; 1124: third segment;
113: rotating shaft; 1131: guide surface;
1132: end surface; 114: second side surface;
115: first clamping slot; 116: groove;
120: sliding member; 121: abutting part;
122: first limiting rib; 123: second limiting rib;
124: sliding block; 130: driving piece;
131: second connecting part; 132: baffle plate;
133: body; 1331: rotating shaft hole;
134: holding part; 135: sliding groove;
140: elastic piece; 141: spiral body;
142: first supporting arm; 143: second supporting arm;
150: cover body; 151: second clamping slot;
200: cage; and 210: spring plate.

DESCRIPTION OF EMBODIMENTS

The following describes specific implementations of this application in detail with reference to the accompanying drawings. It should be understood that the specific implementations described herein are merely used for illustrating and explaining this application, and this application is not limited to the following specific implementations.

A pluggable optical module is mainly connected between a host and an optical cable, and can implement conversion between an optical signal and an electrical signal, so as to implement communication. In a related technology, a cage for accommodating an optical module is disposed on a host, and a spring plate is disposed on the cage. The optical module is disposed in the cage in a pluggable manner, and an unlocking mechanism is disposed on the optical module. The unlocking mechanism includes a housing for installing a circuit board and a handle disposed on the housing. A connecting arm is disposed on a side surface of the housing, and the handle is connected to the connecting arm. After the optical module is plugged into the cage, the spring plate may abut against the connecting arm to lock the optical module. The handle may be rotated to unlock the optical module. In this case, the connecting arm moves relative to the housing to push the spring plate to unlock the optical module.

When the optical module is unlocked, the handle and the connecting arm each have displacement relative to the housing. To enable the connecting arm and the handle to be automatically reset after the handle is released, a columnar coil spring abuts against between the connecting arm of the optical module and the housing. After the handle is released, the connecting arm can be restored to an original position under an action of elastic force of the coil spring, and drive the handle to be reset.

However, when installing the optical module, the connecting arm needs to be plugged into the cage for fitting the spring plate. Therefore, space of an installation position of the connecting arm is limited. A structure that fits the spring plate and a structure that is connected to the coil spring are both disposed. This results in a complex structure of the optical module and it is difficult to implement.

To resolve the foregoing problem, embodiments of this application provide an optical module unlocking apparatus, an optical module, and an optical communications device. Disposing an elastic piece for resetting between a driving piece and a base simplifies a structure of the optical module and improves processing efficiency.

FIG. 1 is a schematic diagram of a structure of an optical communications device according to an embodiment of this application. This embodiment provides an optical communications device. The optical communications device may include a cage 200 and an optical module 100. The optical module 100 is plugged into the cage 200.

There may be a plurality of types of optical communications devices, such as an optical transceiver, an optical fiber transceiver, a switch, an optical fiber network adapter, an optical fiber high-speed dome camera, a base station, and a repeater.

There may be a plurality of cages 200 in the optical communications device. Each cage 200 may be plugged with the optical module 100. The optical module 100 may be applied to the optical communications device. One end of the optical module 100 along an insertion direction can be plugged into the cage 200 of the optical communications device. The other end of the optical module 100 may be configured to connect to an optical cable, so as to perform mutual conversion between an optical signal and an electrical signal.

The optical module 100 may be packaged in a plurality of forms, for example, a quad small form-factor pluggable (QSFP) optical module, a quad small form factor pluggable-double density (QSFP-DD) optical module, a 10 Gigabit small form-factor pluggable (XFP) optical module, and an octal small form-factor pluggable (OSFP) optical module.

The insertion direction may be a direction of plugging or removing the optical module 100, for example, a left-right direction in FIG. 1. For ease of distinguishing, a direction (from left to right in FIG. 1) of plugging the optical module 100 is defined as a direction inward along the insertion direction, and a direction (from right to left in FIG. 1) of removing the optical module is defined as a direction outward along the insertion direction.

Figure 2:
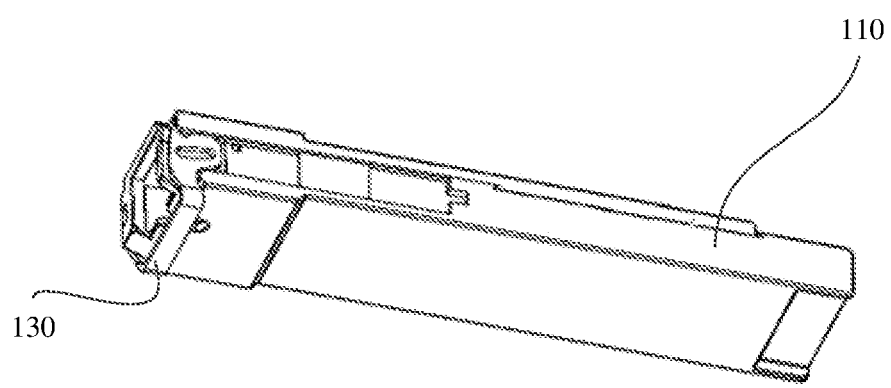
FIG. 2 is a first schematic diagram of a structure of an optical module according to an embodiment of this application.
Figure 3:
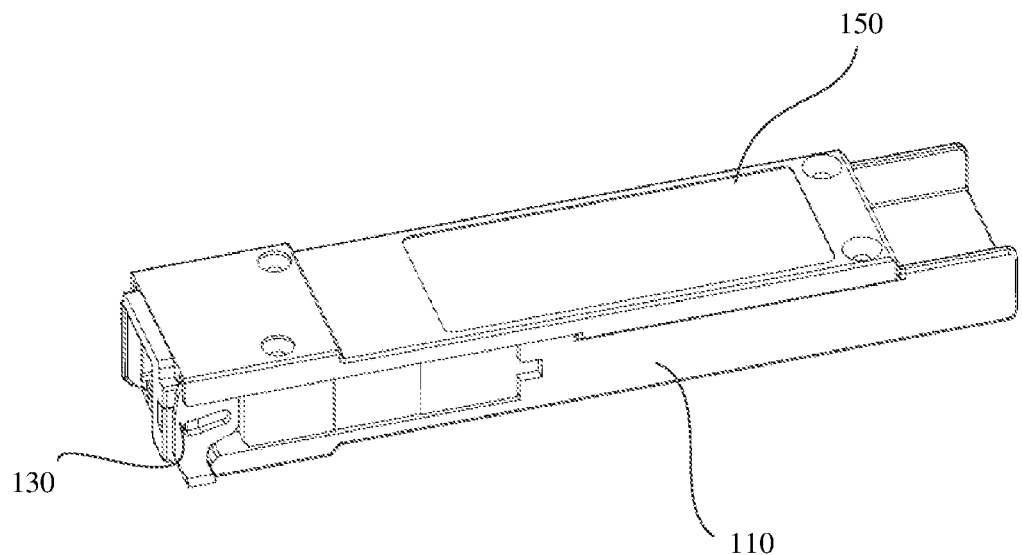
FIG. 3 is a second schematic diagram of a structure of an optical module according to an embodiment of this application.

FIG. 2 is a first schematic diagram of a structure of an optical module according to an embodiment of this application. FIG. 3 is a second schematic diagram of a structure of an optical module according to an embodiment of this application. For ease of clearly viewing a driving piece, a sliding member is not shown in FIG. 2 and FIG. 3.

Refer to FIG. 1 to FIG. 3. The optical module 100 may include an optical module unlocking apparatus and a circuit board installed in the optical module unlocking apparatus. The optical module 100 may be plugged into, removed from, and fastened to the cage 200 by using the optical module unlocking apparatus. The optical module unlocking apparatus may include a base 110, a sliding member 120, and a driving piece 130.

The base 110 may be of a plate-like structure, there may be an accommodating region in space on one side of the base 110, and the circuit board may be installed in the accommodating region. Alternatively, the base 110 may be of a hollow shell-like structure, space enclosed by the base 110 may form an accommodating region, and the circuit board may be installed in the accommodating region. The circuit board may be a main electronic component for implementing optical-to-electrical conversion by the optical module 100. A plurality of electronic components may be installed on the circuit board. This is not limited herein.

In an optional embodiment, a cover body 150 may be further disposed on the base 110. The cover body 150 covers the base 110. The cover body 150 and the base 110 form, in a surrounding manner, the accommodating region for accommodating the circuit board, so as to facilitate removal or installation of the circuit board.

Figure 4:
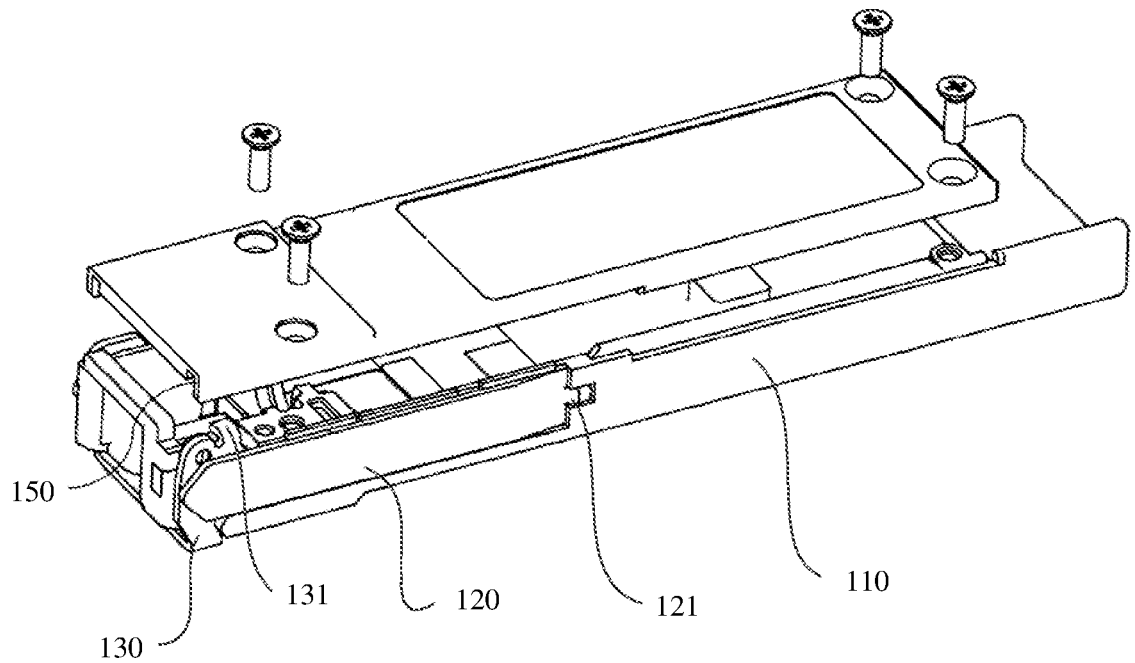
FIG. 4 is an exploded view of an optical module according to an embodiment of this application.

FIG. 4 is an exploded view of an optical module according to an embodiment of this application. Refer to FIG. 4. A base 110 and a cover body 150 may be fastened in a plurality of manners. For example, the base 110 and the cover body 150 may be fastened in a buckling manner. Alternatively, a threaded hole may be disposed on the base 110, a countersunk hole is disposed on the cover body 150, a screw may pass through the countersunk hole and be thread-connected to the threaded hole, and a head of the screw may be accommodated in the countersunk hole, so as to fasten the base 110 and the cover body 150. The structure is reliable and is easy to implement.

Optionally, a heat dissipation part may be further disposed on the base 110, and the heat dissipation part may be in contact with a component on the circuit board, to perform a heat dissipation function. In this way, an optical module 100 can run stably.

In this embodiment, a sliding member 120 may be a plate-like or columnar structure extending along an insertion direction. An abutting part 121 may be disposed at an inward end of the sliding member 120 along the insertion direction. A spring plate 210 may be disposed on a cage 200. After the optical module 100 is plugged into the cage 200, the spring plate 210 may abut against the abutting part 121, so that the optical module 100 and the cage 200 are relatively fastened.

Optionally, the abutting part 121 may be a bump disposed at an inner end of the sliding member 120 along the insertion direction, and a concave may be formed between the bump and the sliding member 120. The spring plate 210 may be buckled in the concave, and a side surface of the spring plate 210 may abut against an outer side surface of the bump along the insertion direction, so as to fasten the optical module 100 and the cage 200.

Figure 5:
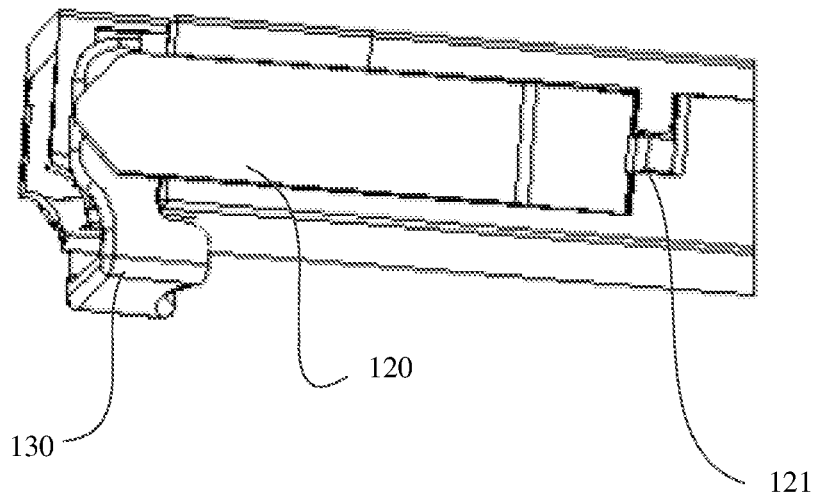
FIG. 5 is a schematic diagram of an optical module unlocking apparatus in a locked state according to an embodiment of this application.
Figure 6:
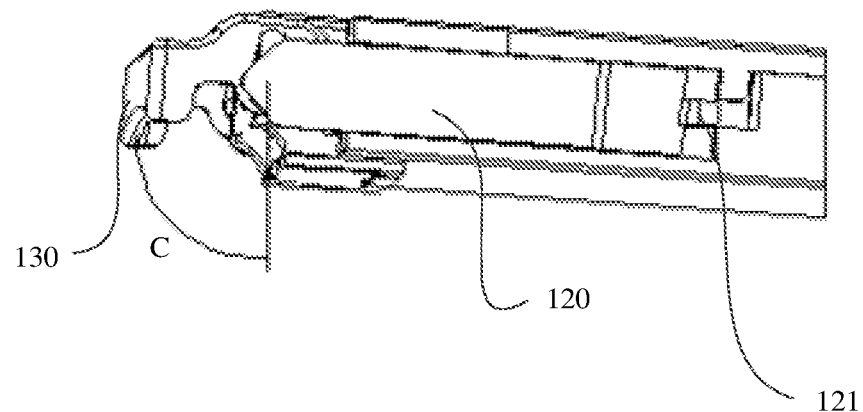
FIG. 6 is a schematic diagram of an optical module unlocking apparatus in an unlocked state according to an embodiment of this application.

FIG. 5 is a schematic diagram of an optical module unlocking apparatus in a locked state according to an embodiment of this application. FIG. 6 is a schematic diagram of an optical module unlocking apparatus in an unlocked state according to an embodiment of this application. With reference to FIG. 5 and FIG. 6, the optical module unlocking apparatus may include a locked state and an unlocked state. When the optical module unlocking apparatus is in the locked state, a sliding member 120 is located at an innermost end of a movement track of the sliding member 120 along an insertion direction, and an abutting part 121 may abut against a spring plate 210. When the optical module unlocking apparatus is in the unlocked state, the sliding member 120 is located at an outermost end of the movement track of the sliding member 120, and the abutting part 121 may push outward the spring plate 210, so that the abutting part 121 may be separated from the spring plate 210.

In addition, to facilitate removal of an optical module 100 from a cage 200, the optical module unlocking apparatus further includes a driving piece 130. The driving piece 130 is rotatably connected to a base 110. The other end that is of the sliding member 120 and that is away from the abutting part 121 may be connected to the driving piece 130. Refer to FIG. 5 and FIG. 6. When the driving piece 130 is pulled by external force, the driving piece 130 rotates by an angle C relative to the base 110, that is, changes from the locked state in FIG. 5 to the unlocked state in FIG. 6. The driving piece 130 may drive the sliding member 120 to be slidably disposed outwardly on the base 110 along the insertion direction, so that the abutting part 121 moves outwards along the insertion direction to push the spring plate 210 and is separated from the spring plate 210. In this case, the optical module 100 can be removed from the cage 200.

The driving piece 130 is rotatably connected to the base 110 in a plurality of manners. For example, the driving piece 130 may be riveted to the base 110 by using a rivet, and the driving piece 130 and the base 110 may rotate relative to each other by using an axis of the rivet as a rotation axis.

Figure 7:
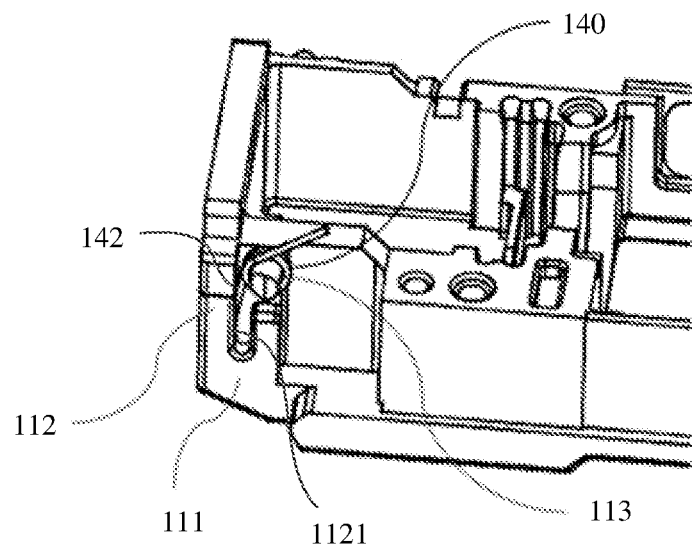
FIG. 7 is an internal schematic diagram of an optical module unlocking apparatus in FIG. 3.

FIG. 7 is an internal schematic diagram of the optical module unlocking apparatus in FIG. 3. In an optional embodiment, a rotating shaft 113 is disposed on the base 110. The driving piece 130 is rotatably connected to the rotating shaft 113. The rotating shaft 113 may be a cylinder. The base 110 and the rotating shaft 113 may be integrally formed, so as to simply a manufacturing process.

For the optical module 100, after the optical module 100 is plugged into the cage 200, only one part is located inside the cage 200, and the other part is located outside the cage 200. The driving piece 130 may be connected to this part, so as to facilitate pulling.

The optical module unlocking apparatus may be further disposed with an elastic piece 140. A first connecting part 111 is disposed on the base 110. A second connecting part 131 is disposed on the driving piece 130. The elastic piece 140 may be connected between the first connecting part 111 and the second connecting part 131. The elastic piece 140 may be configured to implement resetting of the driving piece 130 and the sliding member 120. To be specific, when external force disappears, the driving piece 130 can restore from an unlocked state to a locked state under elastic force of the elastic piece 140, and the sliding member 120 can also be reset from an outermost end of a movement track to an innermost end.

The elastic piece 140 may be an elastic structure such as a coil spring. Two ends of the elastic piece 140 may be respectively connected to an installation part and an unlocking piece. The first connecting part 111 and the second connecting part 131 may be clamps respectively disposed on the base 110 and the driving piece 130. The two ends of the elastic piece 140 may be disposed with clamping jaws that fit the clamps. When an operator applies external force to rotate the driving piece 130, the elastic piece 140 can be stretched and deformed under an action of the external force. Certainly, the deformation may alternatively be compressive deformation, and may be set based on an actual situation.

It may be understood that, in a related technology, when the optical module is installed, the connecting arm needs to be plugged into the cage for fitting the spring plate. Therefore, space of an installation position of the connecting arm is limited. A structure that fits the spring plate and a structure that is connected to the coil spring are both disposed. This results in a complex structure of the optical module and it is difficult to implement. However, in this embodiment, the elastic piece 140 is disposed between the driving piece 130 and the base 110. After the optical module 100 is installed in the cage 200, the driving piece 130 is located outside the cage. In comparison with the sliding member 120, space for disposing the elastic piece 140 on the driving piece 130 is sufficient, and the driving piece 130 does not need to fit the spring plate 210. This simplifies a structure of the optical module and improves processing efficiency.

Figure 8:
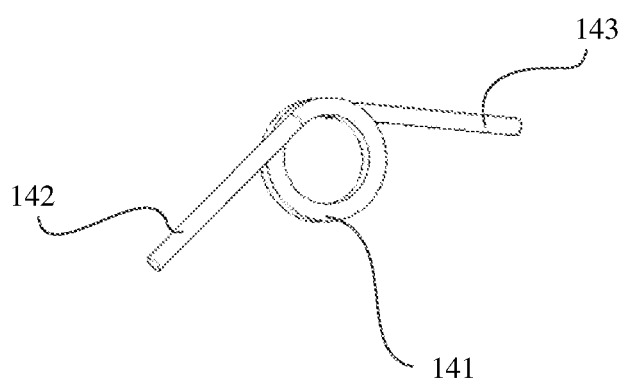
FIG. 8 is a schematic diagram of a structure of an elastic piece in FIG. 7.

FIG. 8 is a schematic diagram of a structure of the elastic piece in FIG. 7. Refer to FIG. 4, FIG. 7, and FIG. 8. In an optional manner of the elastic piece 140, the elastic piece 140 includes a spiral body 141, and a first supporting arm 142 and a second supporting arm 143 that are connected to two ends of the spiral body 141. The spiral body 141 may be a spiral elastic piece, the first supporting arm 142 may be formed by extending outward from one end of the spiral body 141, and the first supporting arm 142 may protrude from a side surface of the spiral body 141.

The second supporting arm 143 may be formed by extending outward from the other end of the spiral body 141, and the second supporting arm 143 may protrude from a side surface of the spiral body 141. There may be an included angle between the first supporting arm 142 and the second supporting arm 143. The included angle may be greater than 90 degrees and less than 180 degrees.

The spiral body 141 may be sleeved on the rotating shaft 113, the first supporting arm 142 may abut against the first connecting part 111, and the second supporting arm 143 may abut against the second connecting part 131. When the operator applies external force to rotate the driving piece 130, the first supporting arm 142 and the second supporting arm 143 approach each other under an action of the external force. To be specific, the included angle between the first supporting arm 142 and the second supporting arm 143 becomes smaller, and the elastic piece 140 is compressed and deformed. In this case, the optical module unlocking apparatus is in the unlocked state. After the optical module 100 is pulled out of the cage, the operator may release the driving piece 130. In this case, the external force disappears, the elastic piece 140 restores to an original shape under an action of the elastic force of the elastic piece 140, and the included angle between the first supporting arm 142 and the second supporting arm 143 becomes larger, so that the driving piece 130 rotates relative to the base 110 to the locked state. The sliding member 120 may also move inwardly along the insertion direction to implement reset.

In this embodiment, the elastic piece 140 is disposed in a structure form of a compression elastic piece including the first supporting arm 142, the second supporting arm 143, and the spiral body 141. In this way, the space occupied by the elastic piece 140 can be reduced, and structures of the first connecting part 111 and the second connecting part 131 can be simplified. Further, a structure of the optical module unlocking apparatus and a manufacturing process are simplified, and costs are reduced. In addition, the elastic piece 140 is an elastic piece deformed under compression, and has high reliability.

Refer to FIG. 7. In an implementation of the first connecting part 111, the first connecting part 111 includes a protrusion 112 disposed on the base 110. The first supporting arm 142 abuts against a first side surface 1121 of the protrusion 112.

The protrusion 112 may have a plurality of shapes, for example, a cylinder, a rectangle, a triangle, or an irregular shape. The structure is simple and is easy to implement. There may also be a plurality of positions of the protrusion 112. Optionally, the protrusion 112 may be located on an outer side of the rotating shaft 113 along an insertion direction. The protrusion 112 may have the first side surface 1121 facing a cylindrical side surface of the rotating shaft 113. The first supporting arm 142 may abut against the first side surface 1121.

Optionally, the protrusion 112 may be integrally formed with the base 110, so as to facilitate processing and improve production efficiency. In addition, when a resetting function of the elastic piece 140 is implemented, the protrusion 112 does not increase a quantity of parts of the optical module unlocking apparatus. The design is simplified, and a structure between the parts is compact, so that a size of the driving piece 130 can be reduced.

Figure 9:
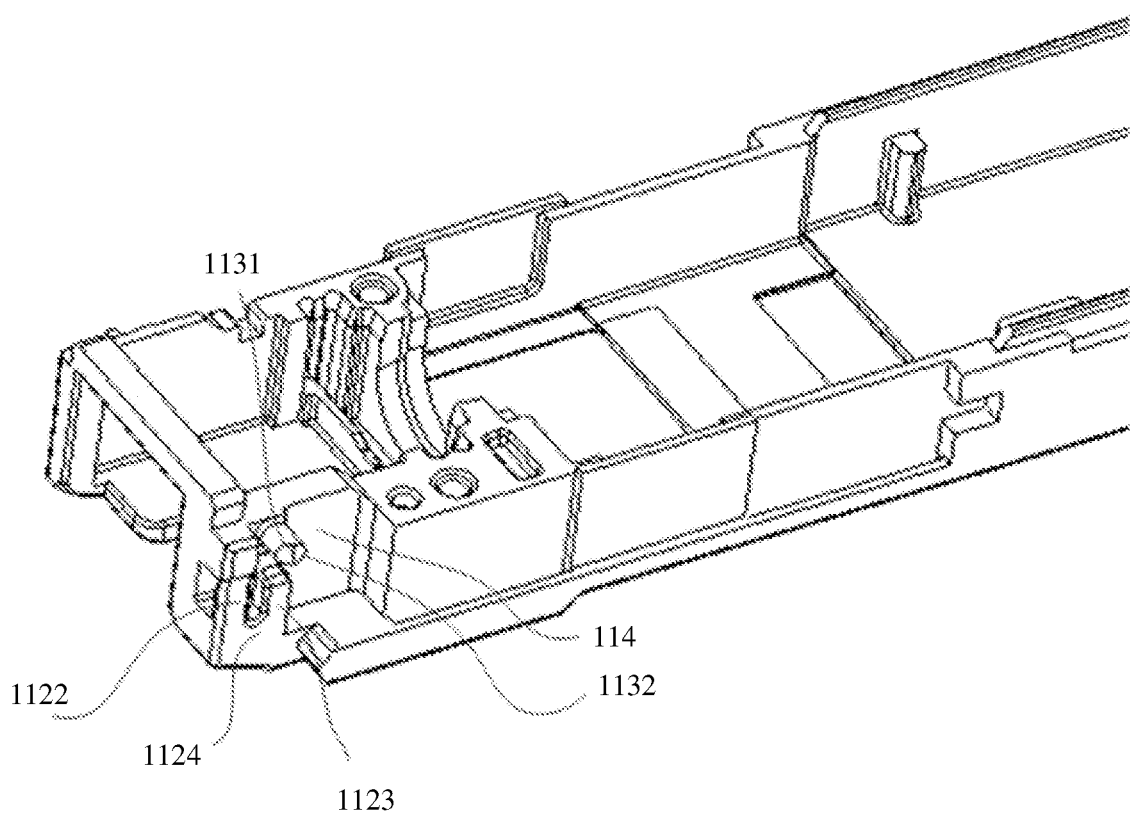
FIG. 9 is a schematic diagram of a structure of a base in FIG. 7.

FIG. 9 is a schematic diagram of a structure of the base in FIG. 7. Refer to FIG. 9. As another shape of the protrusion 112, the protrusion 112 includes a first segment 1122 and a second segment 1123 that are disposed at intervals along the insertion direction.

Optionally, one end of the base 110 along an axis direction of the rotating shaft 113 may have a second side surface 114. The protrusion 112 may protrude from the second side surface 114. Both the first segment 1122 and the second segment 1123 may extend along a preset direction. The preset direction may be a direction perpendicular to both the axis direction of the rotating shaft 113 and the insertion direction.

The second segment 1123 and the rotating shaft 113 may be located on a side that is of the first segment 1122 and that is close to the abutting part 121. The first segment 1122 may be located on an outer side of the second segment 1123 along the insertion direction. The rotating shaft 113 may be located on a top end of the second segment 1123 along the preset direction. A surface that is of the first segment 1122 and that faces the second segment 1123 forms the first side surface 1121. The first supporting arm 142 may be plugged between the first segment 1122 and the second segment 1123 and abut against the first side surface 1121 of the first segment 1122.

The second segment 1123 and the first segment 1122 may limit two sides of the first supporting arm 142, to avoid detachment of the first supporting arm 142 from the base 110 during installation or use, facilitate installation of the elastic piece 140, and improve reliability of the elastic piece 140. In addition, the first segment 1122 and the second segment 1123 may be further configured to limit movement of the driving piece 130 along the axial direction of the rotating shaft 113, so as to provide space for disposing the second connecting part 131.

Optionally, the protrusion 112 further includes a third segment 1124 connected between the first segment 1122 and the second segment 1123. The third segment 1124 is located at one end that is of the first segment 1122 and that is away from the rotating shaft 113. That is, the third segment 1124 may be installed at bottom ends of the first segment 1122 and the second segment 1123 along the preset direction.

The first segment 1122, the second segment 1123, and the third segment 1124 form, in a surrounding manner, an accommodating groove that has an opening at a top end along the preset direction. The first supporting arm 142 may extend into the accommodating groove through the opening. The accommodating groove may further limit installation space of the first supporting arm 142, to facilitate installation. In addition, an area of the protrusion 112 can be increased, and strength of the protrusion 112 and the base 110 can be improved.

Optionally, the first segment 1122, the second segment 1123, and the third segment 1124 may be integrally formed on the base 110 to simplify processing. The first segment 1122, the second segment 1123, and the third segment 1124 may be smoothly transitioned to avoid stress concentration and improve force-bearing performance.

On the basis of the foregoing embodiment, the second connecting part 131 may also be implemented in a plurality of manners. For example, the second connecting part 131 may also be a block-shaped protrusion disposed on the driving piece 130.

Figure 10:
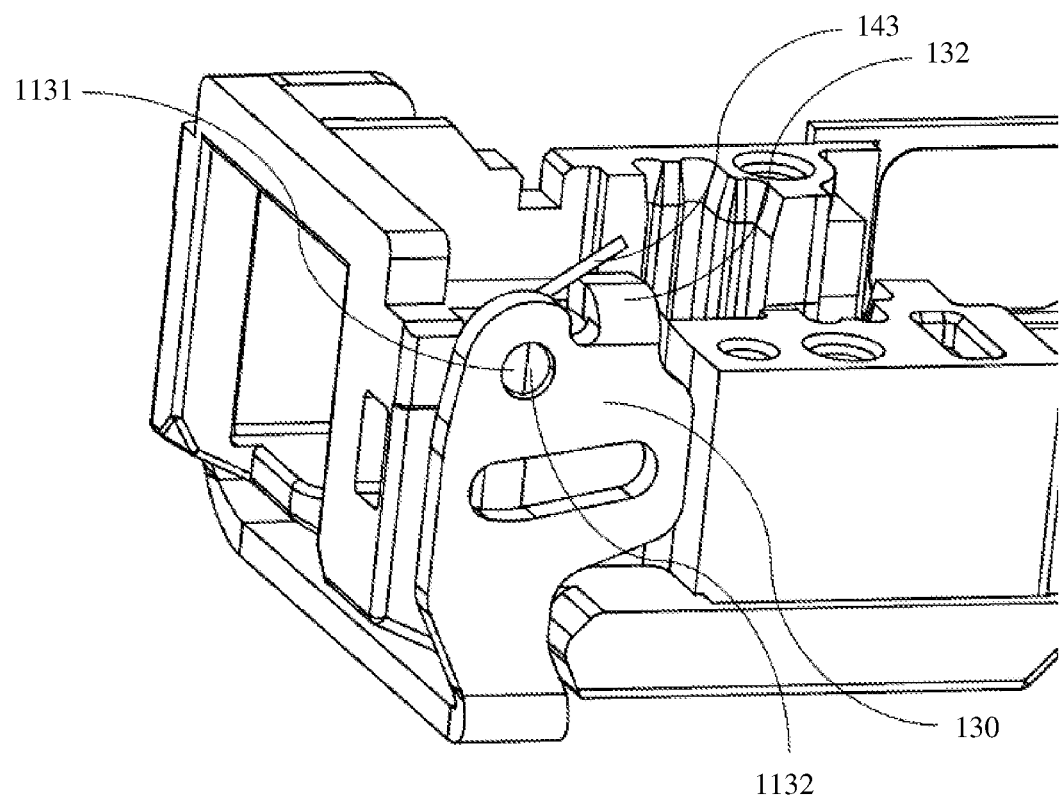
FIG. 10 is a schematic diagram of fitting between a base and a driving piece.

FIG. 10 is a schematic diagram of fitting between a base and a driving piece. Refer to FIG. 10. In an optional manner of a second connecting part 131, the second connecting part 131 includes a baffle plate 132 disposed on a driving piece 130. The baffle plate 132 may be of a plate-like structure. The structure is simple and easy to be processed. A second supporting arm 143 abuts against an inner surface that is of the baffle plate 132 and that faces a rotating shaft 113. By adjusting a position and an angle of the baffle plate 132, an included angle between a first supporting arm 142 and the second supporting arm 143 when the driving piece 130 is in a locked state may be adjusted, so that pretightening force of an elastic piece 140 may be adjusted, and pulling force required for rotating the driving piece 130 is adjusted.

Optionally, when the driving piece 130 is in the locked state, the angle between the first supporting arm 142 and the second supporting arm 143 may be approximately 90 degrees. The pulling force is moderate, and user experience is relatively good.

It may be understood that FIG. 10 may show a state in which the second supporting arm 143 does not abut against the baffle plate 132. In FIG. 10, the second supporting arm 143 is located outside the baffle plate 132. During installation, the second supporting arm 143 needs to be pressed, so that the second supporting arm 143 abuts against the inner surface of the baffle plate 132.

Figure 11:
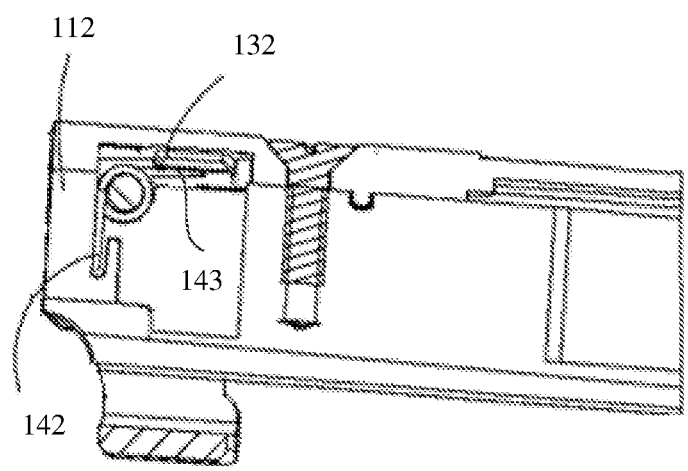
FIG. 11 is a schematic diagram of an elastic piece in a locked state.
Figure 12:
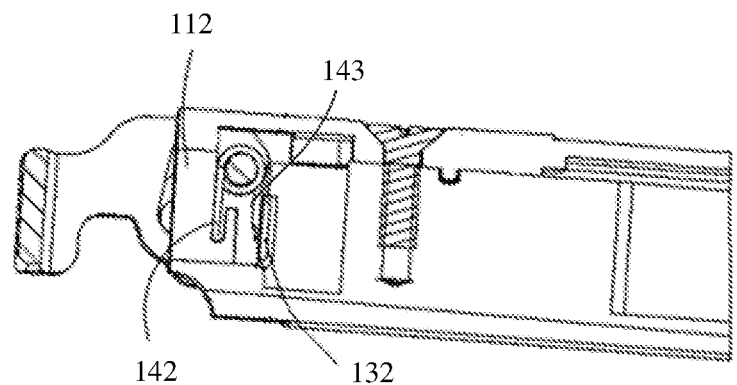
FIG. 12 is a schematic diagram of an elastic piece in an unlocked state.

FIG. 11 is a schematic diagram of an elastic piece in a locked state. FIG. 12 is a schematic diagram of an elastic piece in an unlocked state. Refer to FIG. 11 and FIG. 12. When an optical module unlocking apparatus is in a locked state, an included angle between a first supporting arm 142 and a second supporting arm 143 is the largest. When a driving piece 130 is pulled to rotate from the locked state to an unlocked state, a baffle plate 132 rotates relative to a rotating shaft 113 to squeeze the second supporting arm 143, so that the second supporting arm 143 rotates relative to the first supporting arm 142. The included angle between the second supporting arm 143 and the first supporting arm 142 becomes smaller, and an elastic piece 140 is compressed and deformed. In this case, a sliding member 120 can push a spring plate 210. This is convenient for an operator to remove an optical module 100 from a cage.

Figure 13:
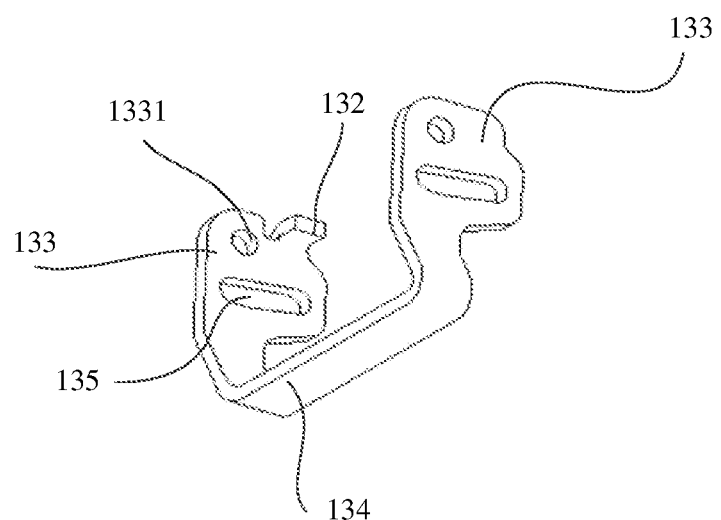
FIG. 13 is a schematic diagram of a structure of a handle in FIG. 3.

FIG. 13 is a schematic diagram of a structure of a handle in FIG. 3. Refer to FIG. 13. In an optional implementation of the driving piece 130, the driving piece 130 includes a body 133 and a holding part 134 that is connected to the body 133.

The body 133 may be of a plate-like structure. A rotating shaft hole 1331 for passing through the rotating shaft 113 is disposed on the body 133. The body 133 is rotatably connected to the rotating shaft 113 through the rotating shaft hole 1331.

The baffle plate 132 may be installed at an edge of the body 133. Optionally, the baffle plate 132 may be formed by bending the edge of the body 133. The structure is simple and is easy to implement.

The baffle plate 132 may protrude inwardly from the body 133 along a direction parallel to an axis of the rotating shaft 113. That is, the baffle plate 132 may extend in a direction close to the second side surface 114. After the body 133 is installed on the rotating shaft 113, the body 133 may be located outside the protrusion 112. Because the protrusion 112 protrudes from the base 110, there is specific space between the body 133 and the second side surface 114, and the baffle plate 132 can rotate freely in the space.

In addition, the body 133 may further cover outsides of the elastic piece 140, to prevent the elastic piece 140 from flying out of the base 110 in a compression process. In this way, safety is high.

The holding part 134 is connected to the body 133. The holding part 134 may be located outside the base 110, and may be a structure that facilitates holding, such as a handle or a handle ring. The holding part 134 may be used by an operator for holding, so that the operator can conveniently rotate the driving piece 130.

Optionally, one rotating shaft 113 is disposed at each of two ends of the base 110 along the direction parallel to the axis of the rotating shaft 113. One body 133 is disposed at each of two ends of the holding part 134, and each body 133 is rotatably connected to one rotating shaft 113.

The holding part 134 may also be of a plate-like structure, and may extend along the direction parallel to the axis of the rotating shaft 113. One plate-like body 133 is disposed at each of the two ends of the holding part 134, and each body 133 is rotatably connected to the base 110. The two bodies 133 may be designed symmetrically. Correspondingly, one elastic piece 140 may be disposed on each rotating shaft 113. When the operator pulls the holding part 134, force applied to the whole driving piece 130 is balanced, and stability is high.

Optionally, when the optical module 100 is in the locked state, the holding part 134 may be rotated to a bottom of the base 110 along a preset direction, and a plane on which the holding part 134 is located may be perpendicular to the preset direction. This can reduce a size of the driving piece 130 and make the entire optical module more compact.

Certainly, there may alternatively be a plurality of sliding members 120. For example, each body 133 is connected to one sliding member 120. Rotating the holding part 134 may drive two sliding members 120 to move along the insertion direction at the same time. The operation is convenient, and the optical module can be quickly unlocked.

The holding part 134 and the body 133 may be processed in a sheet metal manner, and the sliding member 120 may be formed through powder metallurgy. Therefore, a manufacturing process is simplified, and costs are reduced.

Optionally, one end that is of the rotating shaft 113 and that is away from the base 110 has a guide surface 1131 obliquely disposed. A distance between the guide surface 1131 and the second side surface 114 increases from one end away from an abutting part 121 to the other end close to the abutting part 121.

The guide surface 1131 may be of a plane structure. A distance between an outer end of the guide surface 1131 along the insertion direction and the second side surface 114 is small, and a distance between an inner end of the guide surface 1131 along the insertion direction and the second side surface 114 is large. Refer to FIG. 10. When the body 133 is installed, the body 133 may slide along the guide surface 1131, so that the rotating shaft hole 1331 is aligned with the rotating shaft 113, and the body 133 and the rotating shaft 113 can be rotationally connected in a quick and convenient manner.

In addition, optionally, an end surface 1132 disposed perpendicular to the axis of the rotating shaft 113 is further disposed at the end that is of the rotating shaft 113 and that is away from the base 110. The end surface 1132 is connected to an edge that is of the guide surface 1131 and that is close to the abutting part 121.

It may be understood that the guide surface 1131 may be formed by removing a part of the end surface 1132 and a part of a cylindrical side surface of the rotating shaft 113. When the body 133 is installed, the body 133 may slide along the guide surface 1131. In this case, a distance between the body 133 and the second side surface 114 may be increased, so that the rotating shaft 113 can easily enter inside the rotating shaft hole 1331. After the body 133 moves for a distance along the guide surface 1131, the body 133 may be in contact with the end surface 1132. A contact area between the body 133 and the guide surface 1131 is relatively large, so as to avoid the guide surface 1131 from scratching the body 133.

On the basis of the foregoing embodiment, to enable rotation of the driving piece 130 to drive the sliding member 120 to move along the insertion direction, a cam may be disposed on the driving piece 130, and a contact part abutting against a side surface of the cam may be disposed on the sliding member 120. When the driving piece 130 rotates, the cam may push the contact part to move along the insertion direction.

Figure 14:
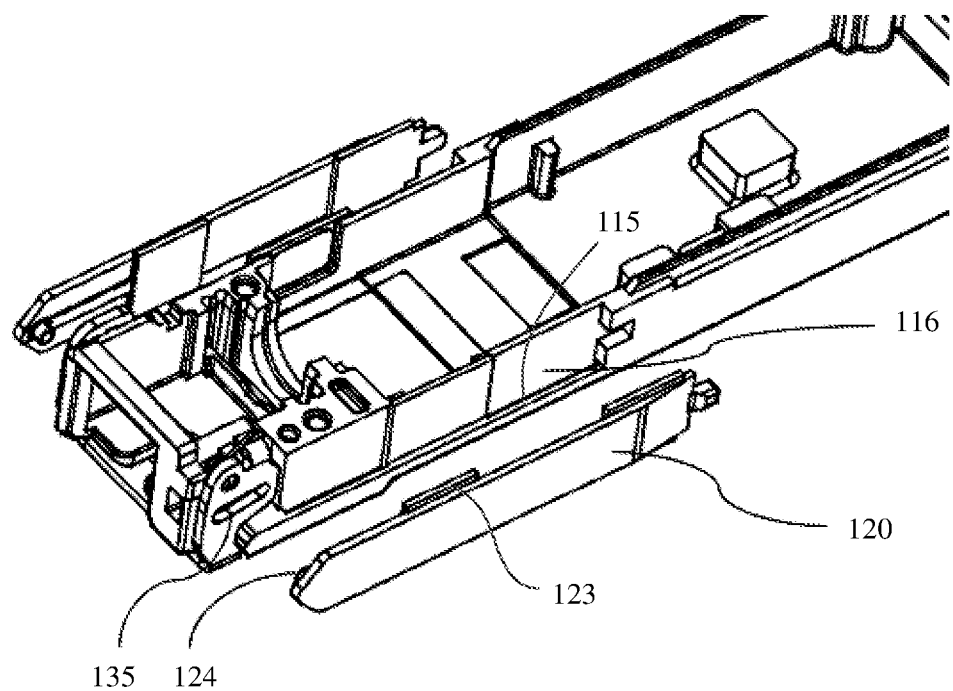
FIG. 14 is a schematic diagram of fitting between a base and a sliding member.

FIG. 14 is a schematic diagram of fitting between a base and a sliding member. Refer to FIG. 14. Optionally, in another embodiment, a sliding groove 135 is disposed on a body 133, and a sliding block 124 is disposed on a sliding member 120. The sliding block 124 is slidably disposed in the sliding groove 135, to convert a rotational motion of a driving piece 130 into a straight-line movement of the sliding member 120 along an insertion direction.

The sliding groove 135 may be a long strip-shaped groove, and may extend along a straight line direction. The sliding block 124 may be of a cylindrical structure, and may be plugged into the sliding groove 135. When the driving piece 130 rotates, relative motion occurs between the sliding block 124 and the sliding groove 135, so that the sliding member 120 may have displacement along the insertion direction. Structures of the sliding block 124 and the sliding groove 135 are simple and are easy to implement.

In this embodiment, there may be a plurality of positions of the sliding member 120. For example, the other end of the sliding member 120 may be disposed between the body 133 and the base 110.

Optionally, the body 133 is disposed between the base 110 and the sliding member 120. The sliding groove 135 passes through the driving piece 130 along a direction parallel to an axis of a rotating shaft 113. That is, the sliding groove 135 is a through groove disposed on the body 133. The sliding block 124 may be disposed on an inner surface that is of the sliding member 120 and that faces the base 110. Because structures such as the rotating shaft 113 and an elastic piece 140 are disposed between the body 133 and the base 110, disposing the sliding member 120 on an outer side of the body 133 can simplify a structure between the body 133 and the base 110 and improve production efficiency.

Figure 15:
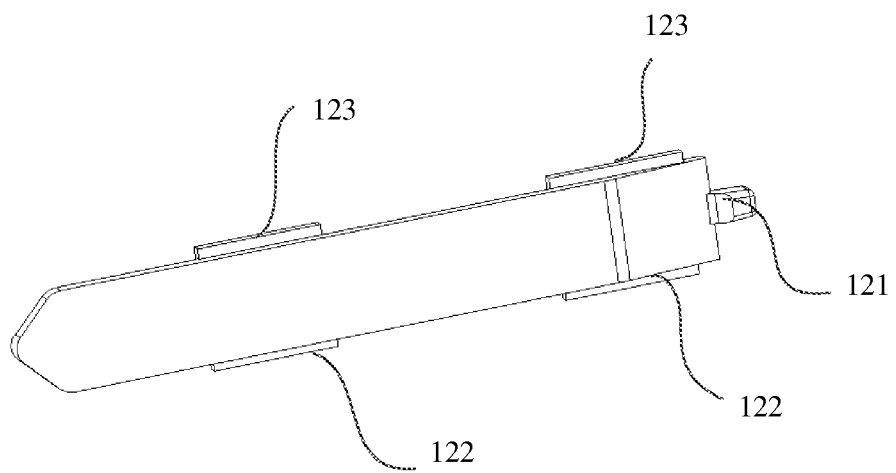
FIG. 15 is a schematic diagram of a front side structure of a sliding member in FIG. 4.
Figure 16:
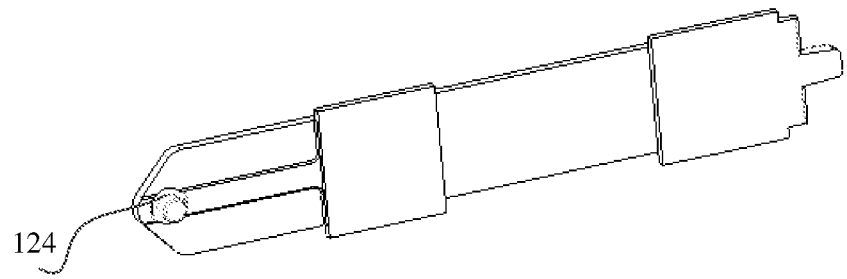
FIG. 16 is a schematic diagram of a back side structure of a sliding member in FIG. 4.

FIG. 15 is a schematic diagram of a front side structure of the sliding member in FIG. 4. FIG. 16 is a schematic diagram of a back side structure of the sliding member in FIG. 4. Refer to FIG. 15 and FIG. 16. On the basis of the foregoing embodiment, in a sliding connection manner between the base 110 and the sliding member 120, a first clamping slot 115 extending along the insertion direction is disposed on the base 110. A first limiting rib 122 slidably disposed in the first clamping slot 115 is disposed on the sliding member 120.

The sliding member 120 may be approximately a plate-like structure parallel to the first side surface 1121, and the first limiting rib 122 may be disposed on a side surface of the sliding member 120 along a preset direction.

A length of the first limiting rib 122 along the insertion direction may be less than a length of the first clamping slot 115, so that the first limiting rib 122 can slide in the first clamping slot 115. In addition, the first clamping slot 115 may further limit movement of the sliding member 120 along the direction parallel to the axis of the rotating shaft 113.

Further, refer to FIG. 14. A groove 116 for accommodating the sliding member 120 is disposed on the base 110. The first clamping slot 115 is disposed on an inner wall surface of the groove 116. After the driving piece 130 is installed in the groove 116, an outer surface of the driving piece 130 may be approximately parallel to a side surface of the base 110, so as to improve integrity of the optical module 100. Because a size of the cage 200 has a specific standard, installing the driving piece 130 in the groove 116 may correspondingly increase a size of an accommodating region for accommodating the circuit board in the base 110, and improve function diversity of the optical module 100.

Optionally, there are a plurality of first limiting ribs 122. The plurality of first limiting ribs 122 are arranged at intervals along the insertion direction, so that the sliding member 120 can be prevented from shaking in a sliding process, and stability is high.

Figure 17:
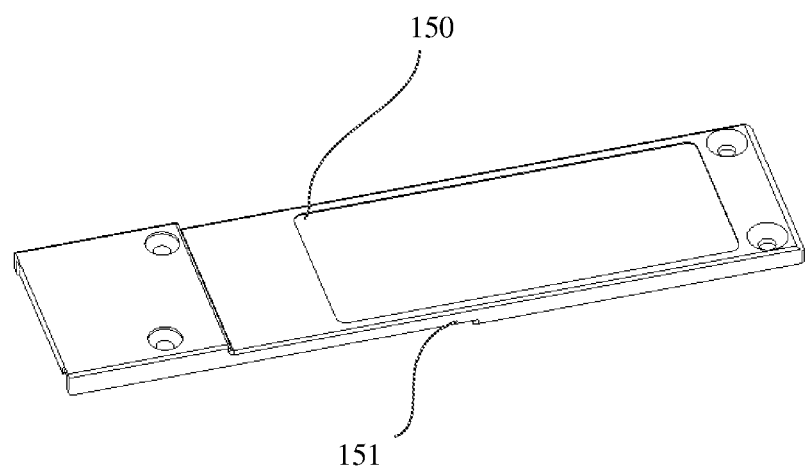
FIG. 17 is a schematic diagram of a structure of a cover body in FIG. 4.

FIG. 17 is a schematic diagram of a structure of the cover body in FIG. 4. Refer to FIG. 17. When the cover body 150 is disposed on the optical module unlocking apparatus, a second clamping slot 151 extending along the insertion direction is disposed on the cover body 150. A second limiting rib 123 slidably disposed in the second clamping slot 151 is disposed on the sliding member 120.

The second limiting rib 123 may be disposed on a side surface opposite to a first limiting rib 122. The second limiting rib 123 may extend into the second clamping slot 151. A length of the second limiting rib 123 along the insertion direction may be less than a length of the second clamping slot 151, so that the second limiting rib 123 can slide in the second clamping slot 151. In addition, the second clamping slot 151 may further limit movement of the sliding member 120 along the direction parallel to the axis of the rotating shaft 113.

The first clamping slot 115 and the second clamping slot 151 may limit the driving piece 130 from two sides, so that installation reliability of the driving piece 130 is relatively high.

Optionally, there are a plurality of second limiting ribs 123. The plurality of second limiting ribs 123 are arranged at intervals along the insertion direction, so that the sliding member 120 can be prevented from shaking in the sliding process, and stability is high.

Figure 18:
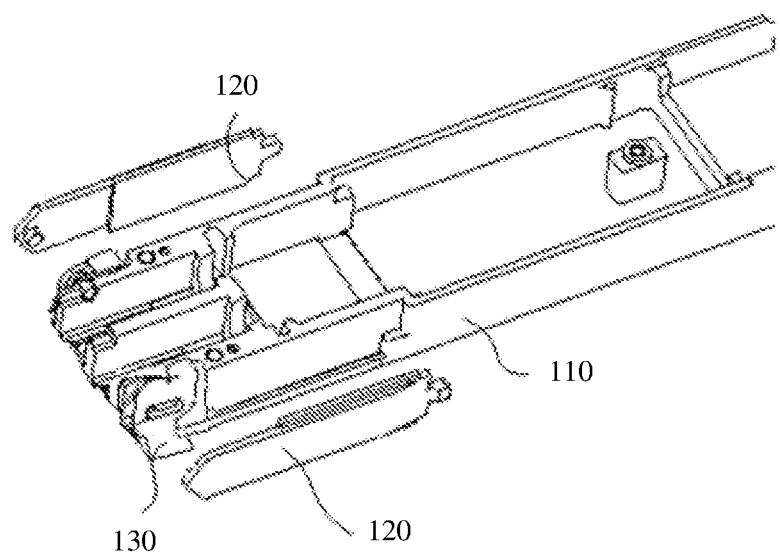
FIG. 18 is a schematic diagram of a structure of an optical module according to another embodiment of this application.
Figure 19:
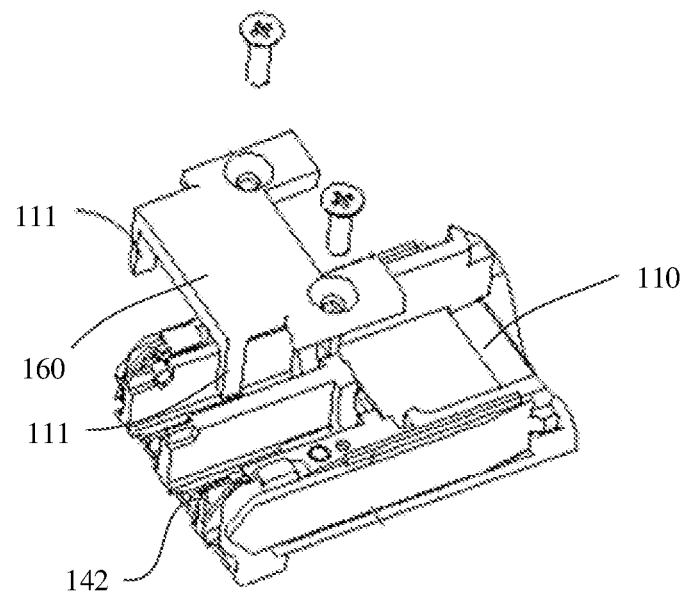
FIG. 19 is a partial exploded view of FIG. 18.
Figure 20:
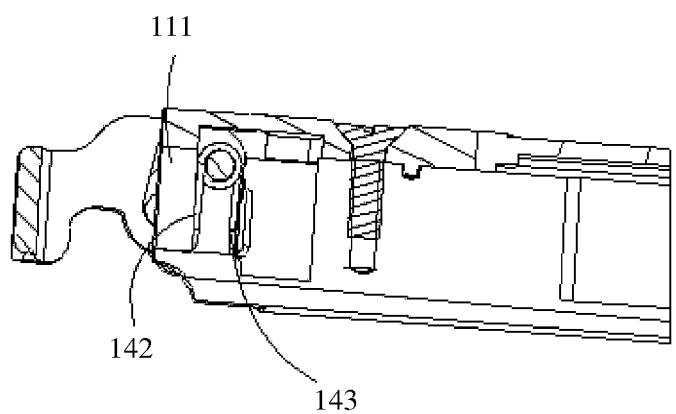
FIG. 20 is a sectional view of FIG. 19.

FIG. 18 is a schematic diagram of a structure of an optical module according to another embodiment of this application. FIG. 19 is a partial exploded view of FIG. 18. FIG. 20 is a sectional view of FIG. 19. Refer to FIG. 18 to FIG. 20. In this embodiment, a structure of a first connecting part 111 is improved based on the foregoing embodiment. For a structure and a connection form of another part, refer to the foregoing embodiment. Details are not described herein again.

In this embodiment, in addition to a base 110 and a cover body 150 (not shown), a lid 160 may also be disposed on an optical module unlocking apparatus. The lid 160 may be fastened on the base 110, and the first connecting part 111 extending along a preset direction may be disposed on the lid 160.

It may be understood that, a circuit board may be placed in an accommodating region enclosed by the cover body 150 and the base 110. The lid 160 may be disposed at a front end of the cover body 150 along an insertion direction. The first connecting part 111 on the lid 160 may extend downward from the top along the preset direction and may be attached to a side surface of the base 110. A first supporting arm 142 of an elastic piece 140 may abut against a side surface of the first connecting part 111, so as to implement connection of the first supporting arm 142 of the elastic piece 140.

Finally, it should be noted that the foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An optical module unlocking apparatus, comprising:
   a base configured to accommodate a circuit board, wherein a first connecting part is disposed on the base;
   a sliding member slidably disposed on the base along an insertion direction, wherein a first end of the sliding member has an abutting part configured to abut against a spring plate of a cage;
   a driving piece having a second connecting part disposed thereon and being rotatably connected to the base, wherein a second end of the sliding member is connected to the driving piece, and wherein the driving piece is configured to rotate from a locked state to an unlocked state relative to the base under an action of external force and drive the sliding member to move relative to the base along the insertion direction so that the abutting part is separated from the spring plate;
   an elastic piece connected between the first connecting part and the second connecting part, and configured to, when the driving piece ceases to be under the action of the external force, restore the driving piece from the unlocked state to the locked state under an action of elastic force of the elastic piece; and
   a rotating shaft formed on the base, wherein the driving piece is rotatably connected to the rotating shaft, wherein
   the elastic piece comprises a spiral body, and a first supporting arm and a second supporting arm that are connected to two ends of the spiral body;
   the spiral body is sleeved on the rotating shaft, the first supporting arm abuts against the first connecting part, and the second supporting arm abuts against the second connecting part; and
   the rotating shaft is protuberantly disposed on a second side surface of the base, one end that is of the rotating shaft and that is away from the base has a guide surface obliquely disposed, and a distance between the guide surface and the second side surface increases from one end away from the abutting part to the other end close to the abutting part.

2. The optical module unlocking apparatus according to claim 1, wherein
   the first connecting part comprises a protrusion disposed on the base, and the first supporting arm abuts against a first side surface of the protrusion.

3. The optical module unlocking apparatus according to claim 2, wherein
   the protrusion comprises a first segment and a second segment that are disposed at intervals along the insertion direction, and the second segment and the rotating shaft are located on a side that is of the first segment and that is close to the abutting part; and
   the first supporting arm is located between the first segment and the second segment, and a surface that is of the first segment and that faces the second segment forms the first side surface.

4. The optical module unlocking apparatus according to claim 3, wherein
the protrusion further comprises a third segment connected between the first segment and the second segment, the third segment is located at one end that is of the first segment and that is away from the rotating shaft, and the first segment, the second segment, and the third segment form, in a surrounding manner, an accommodating groove used to accommodate the first supporting arm.

5. The optical module unlocking apparatus according to claim 2, wherein
the second connecting part comprises a baffle plate disposed on the driving piece, and the second supporting arm abuts against an inner surface that is of the baffle plate and that faces the rotating shaft.

6. The optical module unlocking apparatus according to claim 5, wherein
the driving piece comprises a body and a holding part that is connected to the body; and
a rotating shaft hole for passing through the rotating shaft is disposed on the body, the body is located outside the protrusion, the baffle plate is disposed at an edge of the body, and the baffle plate protrudes inwardly from the body along a direction parallel to an axis of the rotating shaft.

7. The optical module unlocking apparatus according to claim 6, wherein
one rotating shaft is disposed at each of two ends of the base along the direction parallel to the axis of the rotating shaft; and one body is disposed at each of two ends of the holding part, and each body is rotatably connected to one rotating shaft.

8. The optical module unlocking apparatus according to claim 1, wherein
an end surface disposed perpendicular to the axis of the rotating shaft is further disposed at the end that is of the rotating shaft and that is away from the base, and the end surface is connected to an edge that is of the guide surface and that is close to the abutting part.

9. The optical module unlocking apparatus according to claim 6, wherein
a sliding groove is disposed on the body, and a sliding block is disposed on the sliding member; and the sliding block is slidably disposed in the sliding groove, to convert a rotational motion of the driving piece into a straight-line movement of the sliding member along the insertion direction.

10. The optical module unlocking apparatus according to claim 9, wherein
the body is disposed between the base and the sliding member; and
the sliding groove passes through the driving piece along the direction parallel to the axis of the rotating shaft, and the sliding block is disposed on an inner surface that is of the sliding member and that faces the base.

11. The optical module unlocking apparatus according to claim 1, wherein
a first clamping slot extending along the insertion direction is disposed on the base, and a first limiting rib slidably disposed in the first clamping slot is disposed on the sliding member.

12. The optical module unlocking apparatus according to claim 11, wherein
a groove for accommodating the sliding member is disposed on the base, and the first clamping slot is disposed on an inner wall surface of the groove; and
the first limiting rib is located at one end of the sliding member along a preset direction, wherein both the preset direction and the insertion direction are perpendicular to a rotation axis of the driving piece.

13. The optical module unlocking apparatus according to claim 12, wherein
there are a plurality of first limiting ribs, and the plurality of first limiting ribs are arranged at intervals along the insertion direction.

14. The optical module unlocking apparatus according to claim 1, wherein
a cover body is further disposed on the base, and the cover body and the base together form, in a surrounding manner, an accommodating region for accommodating the circuit board.

15. The optical module unlocking apparatus according to claim 14, wherein
a second clamping slot extending along the insertion direction is disposed on the cover body, and a second limiting rib slidably disposed in the second clamping slot is disposed on the sliding member.

16. An optical module, comprising:
a circuit board; and
an optical module unlocking apparatus comprising:
a base configured to accommodate a circuit board, wherein a first connecting part is disposed on the base;
a sliding member slidably disposed on the base along an insertion direction, wherein a first end of the sliding member has an abutting part configured to abut against a spring plate of a cage;
driving piece having a second connecting part disposed thereon and being rotatably connected to the base, wherein a second end of the sliding member is connected to the driving piece, and wherein the driving piece is configured to rotate from a locked state to an unlocked state relative to the base under an action of external force and drive the sliding member to move relative to the base along the insertion direction so that the abutting part is separated from the spring plate;
an elastic piece connected between the first connecting part and the second connecting part, and configured to, when the driving piece ceases to be under the action of the external force, restore the driving piece from the unlocked state to the locked state under an action of elastic force of the elastic piece; and
a rotating shaft formed on the base, wherein the driving piece is rotatably connected to the rotating shaft, wherein
the elastic piece comprises a spiral body, and a first supporting arm and a second supporting arm that are connected to two ends of the spiral body;
the spiral body is sleeved on the rotating shaft, the first supporting arm abuts against the first connecting part, and the second supporting arm abuts against the second connecting part; and
the rotating shaft is protuberantly disposed on a second side surface of the base, one end that is of the rotating shaft and that is away from the base has a guide surface obliquely disposed, and a distance between the guide surface and the second side surface increases from one end away from the abutting part to the other end close to the abutting part, and wherein the circuit board is installed on the base.

17. An optical communications device, comprising:
a cage; and
an optical module comprising:
  a circuit board; and
  an optical module unlocking apparatus comprising:
    a base configured to accommodate a circuit board, wherein a first connecting part is disposed on the base;
    a sliding member slidably disposed on the base along an insertion direction, wherein a first end of the sliding member has an abutting part configured to abut against a spring plate of a cage;
    a driving piece having a second connecting part disposed thereon and being rotatably connected to the base, wherein a second end of the sliding member is connected to the driving piece, and wherein the driving piece is configured to rotate from a locked state to an unlocked state relative to the base under an action of external force and drive the sliding member to move relative to the base along the insertion direction so that the abutting part is separated from the spring plate;
    an elastic piece connected between the first connecting part and the second connecting part, and configured to, when the driving piece ceases to be under the action of the external force, restore the driving piece from the unlocked state to the locked state under an action of elastic force of the elastic piece; and
    a rotating shaft formed on the base, wherein the driving piece is rotatably connected to the rotating shaft, wherein
      the elastic piece comprises a spiral body, and a first supporting arm and a second supporting arm that are connected to two ends of the spiral body;
      the spiral body is sleeved on the rotating shaft, the first supporting arm abuts against the first connecting part, and the second supporting arm abuts against the second connecting part; and
      the rotating shaft is protuberantly disposed on a second side surface of the base, one end that is of the rotating shaft and that is away from the base has a guide surface obliquely disposed, and a distance between the guide surface and the second side surface increases from one end away from the abutting part to the other end close to the abutting part,
    wherein the circuit board is installed on the base, and
  wherein a spring plate is disposed on the cage, the optical module is plugged into the cage, and an abutting part of the optical module abuts against the spring plate.

* * * * *